UNITED STATES PATENT OFFICE.

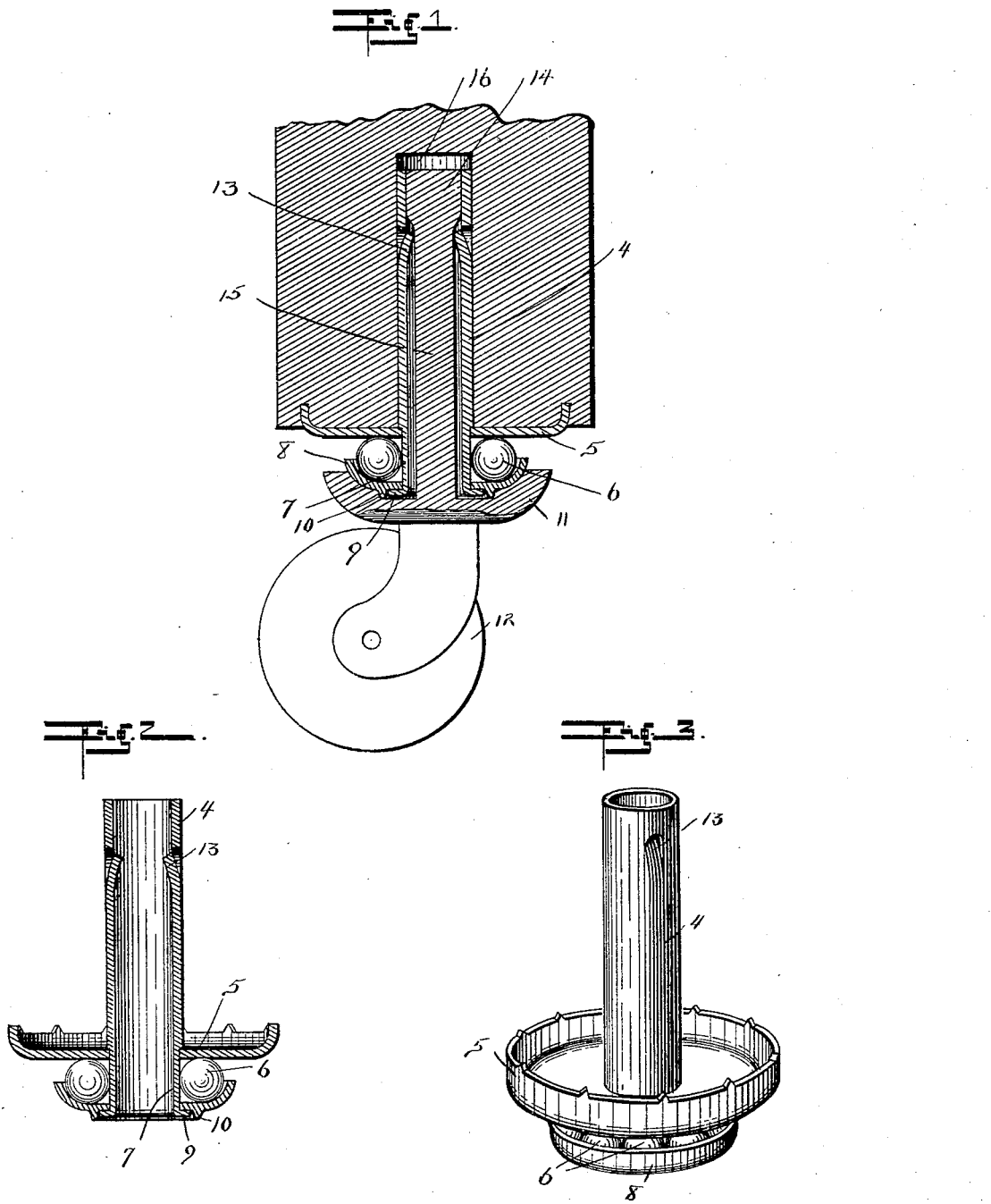

JOHN W. BATEMAN, OF INDIANAPOLIS, INDIANA.

CASTER.

SPECIFICATION forming part of Letters Patent No. 632,774, dated September 12, 1899.

Application filed April 12, 1899. Serial No. 712,688. (No model.)

*To all whom it may concern:*

Be it known that I, JOHN W. BATEMAN, a citizen of the United States, residing at Indianapolis, in the county of Marion and State of Indiana, have invented a new and useful Ball-Bearing-Caster Socket, of which the following is a specification.

My invention relates to an improvement in ball-bearings for casters.

The object of my invention is to produce a ball-bearing socket which may be secured to furniture and with which the usual form of casters may be made to coöperate, the arrangement being such that the caster may be removed from the socket without disturbing the balls of the bearing.

The accompanying drawings illustrate my invention.

Figure 1 is a central vertical section with a caster in coöperating position. Fig. 2 is a similar section of the complete socket. Fig. 3 is a perspective view thereof.

In the drawings, 4 indicates a sleeve, to which is secured near the lower end a collar 5. The under face of collar 5 forms a bearing for a series of balls 6, and said collar should preferably be immovably secured to sleeve 4. Upon the lower end 7 of sleeve 4 is rotatably mounted a ball cup or collar 8, which receives and supports balls 6. Cup 8 is held on the sleeve by means of a retaining-flange 9, formed on the lower end of said sleeve. The lower side of cup 8 may be provided with a rib 10, which extends below flange 9, so that the flange 11 of a caster 12 may bear upon and hold the cup instead of bearing upon the end of the sleeve 4. If desired, sleeve 4 may be formed with one or more retaining-lips 13 of the usual form, which may engage the enlarged head 14 of the shank 15 of caster 12 in the usual manner, so as to prevent the accidental displacement of the caster.

In the drawings I have shown flange 11 of caster 12 of a form best fitted to coöperate with the ball-cup 8; but it will be readily understood that any form of flange, so long as it engages cup 8 without bearing upon the end of sleeve 4, will coöperate with my peculiar form of socket. The construction shown in Figs. 2 and 3 therefore will, when applied to usual forms of non-ball-bearing casters, make successful ball-bearing casters of them.

The operation is apparent. The complete socket, including the balls and bearings therefor, may be applied in the usual manner, sleeve 4 being inserted in the usual socket 16 and the upper face of collar 5 sinking into the leg 17. The shank of caster 12 may then be inserted into sleeve 4 or withdrawn therefrom without in any manner disturbing the ball-bearing.

I claim as my invention—

1. As an article of manufacture, a ball-bearing-caster socket consisting of a sleeve adapted to receive a removable caster-shank, a pair of collars mounted on said sleeve, one of said collars being rotatable upon the sleeve, and a series of balls or rollers retained between said collars.

2. As an article of manufacture, a ball-bearing-caster socket consisting of a sleeve adapted to receive a caster-shank, a collar secured to said sleeve, a second collar rotatably mounted on said sleeve and having a portion extending below the lower end of the sleeve, and a series of balls or rollers retained between the collars.

3. As an article of manufacture, a ball-bearing-caster socket consisting of a central sleeve or stem, a pair of collars mounted upon said stem, one of said collars being rotatable with relation to the other, and a series of balls mounted between said collars, the arrangement being such that one of said collars may be secured to the article to be supported and the other of said collars engaged by a detachable caster.

JOHN W. BATEMAN.

Witnesses:
ARTHUR M. HOOD,
FRANK A. FAHLE.